United States Patent

Harrington

(10) Patent No.: US 6,650,775 B1
(45) Date of Patent: Nov. 18, 2003

(54) METHOD AND APPARATUS FOR IMPLEMENTING A STREAMING TWO-DIMENSIONAL DIGITAL IMAGE SEGMENTATION

(75) Inventor: Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/379,306

(22) Filed: Aug. 23, 1999

(51) Int. Cl.⁷ .................. G06K 9/34; G06K 9/46; G06K 9/50
(52) U.S. Cl. .................. 382/173; 382/174; 382/104
(58) Field of Search .................. 382/164, 165, 382/171, 173, 174, 193, 194, 199, 200, 237; 358/2.1, 2.99

(56) References Cited

U.S. PATENT DOCUMENTS

| | | | |
|---|---|---|---|
| 5,767,978 A | | 6/1998 | Revankar et al. |
| 5,850,474 A | | 12/1998 | Fan et al. |
| 6,081,620 A | * | 6/2000 | Anderholm .................. 382/194 |
| 6,185,328 B1 | * | 2/2001 | Shiau .................. 382/173 |
| 6,229,923 B1 | * | 5/2001 | Williams et al. .................. 382/224 |
| 6,263,091 B1 | * | 7/2001 | Jain et al. .................. 382/125 |
| 6,333,993 B1 | * | 12/2001 | Sakamoto .................. 382/173 |
| 6,389,163 B1 | * | 5/2002 | Jodoin et al. .................. 382/173 |
| 6,400,844 B1 | * | 6/2002 | Fan et al. .................. 382/173 |
| 6,549,658 B1 | * | 4/2003 | Schweid et al. .................. 382/173 |

OTHER PUBLICATIONS

Normand, N; a background based adaptive page segmentation algorithm, I.E.E.E. p. 138–141 vol. 1, 1995.*

* cited by examiner

Primary Examiner—Amelia M. Au
Assistant Examiner—Brian Q Le
(74) Attorney, Agent, or Firm—Fay, Sharpe, Fagan, Minnich & McKee, LLP

(57) ABSTRACT

A method and apparatus for implementing a streaming two-dimensional digital image segmentation is provided. The image segmentation method is compatible with architectures for scan-line processing and streaming image data. More particularly, the method is accomplished by detecting horizontal runs of non-background image elements potentially having a particular property, calculating an average strength value of the property for the run and comparing the value to a threshold. A separate strength value for the property and run start position are maintained for each vertical column of image elements. Thus, an average strength value of a vertical run is calculated for each image element in the horizontal run and compared with the average strength value for the horizontal run. If the results agree, the image elements are tagged accordingly (i.e. whether the property is present). However, a strategy for resolving the results is implemented when the horizontal and vertical analyses do not agree. Several predetermined schemes for doing so are contemplated.

21 Claims, 3 Drawing Sheets

METHOD AND APPARATUS FOR IMPLEMENTING A STREAMING TWO-DIMENSIONAL DIGITAL IMAGE SEGMENTATION

BACKGROUND OF THE INVENTION

This invention relates to a method and apparatus for implementing a streaming two-dimensional digital image segmentation. More particularly, the invention is related to an image segmentation method that is compatible with architectures for scan-line processing and streaming image data. The method of the invention is accomplished by detecting horizontal runs of adjacent non-background image elements potentially having a particular property, calculating an average strength value of the property for each run and comparing it to a threshold. A separate strength value for the property and run start position are also kept for each vertical column of image elements. Thus, an average strength value of a vertical run can also be calculated for each image element in the horizontal run and compared with the average strength value for the horizontal run. If the results agree, the image elements are tagged accordingly (i.e. whether the property is present). However, a strategy for resolving the results is implemented when the horizontal and vertical analyses do not agree. Several predetermined schemes for doing so are contemplated.

While the invention is particularly directed to the art of image segmentation useful for implementation with digital image processing devices such as copiers, scanners, fax machines, etc. and will be thus described with specific reference thereto, it will be appreciated that the invention may have usefulness in other fields and applications. For example, the invention may be used in any application where there is a desire to perform analysis of the properties of a digital image but a lack of sufficient storage space and/or capability in a system to store and/or manipulate a complete image.

By way of background, in order to provide the optimal rendition of a rasterized image, it is useful to understand the characteristics of the image. Different rendering and/or compression techniques can be applied depending on factors such as whether the image is color or black-and-white, whether it is picture or text, or whether it is halftoned or continuous tone. It is therefore useful to determine whether properties such as color, half-tone, text, . . . etc. are present in particular regions of the image.

From a practical standpoint, a page may not have uniform characteristics, but rather may be composed of regions that have their own respective properties. For example, a page may contain a region with a colored picture and another region with black-and-white text. For optimal rendering, analyzing the page to discover these regions and to identify their characteristics is required. This constitutes one approach to image segmentation.

In addition, the page image sought to be segmented may be generated from the scan of a digital copier. In this situation, there may be no information about the page other than the scanned raster image, so the segmentation is based solely on the image data. These circumstances may also require that the image data stream from the scanner to the printer. Thus, the full image is not stored at any one time. This means that the segmentation processing is limited to one or, at most, a few scan lines of the image for analysis.

Accordingly, known region identification methods that operate under this streaming constraint are one dimensional. Such methods analyze the streaming data within the scan and segment the scan into regions. Each scan is essentially processed independently.

For example, U.S. Pat. No. 5,850,474 to Fan has taught that segmentation can be done by first performing a local micro-analysis to determine the properties of pixels or blocks of pixels, and then by conducting a macro-analysis to group those pixels or blocks into regions, and to identify the characteristic properties of the regions.

Because such known methods are one dimensional, information for implementing the segmentation is necessarily limited. It would be desirable to make available more information upon which to base decisions on the segmentation.

The present invention contemplates a new and improved digital image segmentation method that resolves the above-referenced difficulties and others. More particularly, this invention is directed to a two-dimensional image segmentation that can be accomplished even though the image data is limited to only a few scans at any time.

SUMMARY OF THE INVENTION

A method and apparatus for implementing a streaming two-dimensional digital image segmentation are provided. The digital image is comprised of a plurality of image elements disposed in an arrangement of horizontal rows and vertical columns. The image elements include a first type positioned in a background portion and a second type positioned in a non-background portion, the second type of the image elements each having a value defining a strength of a property, there being at least two classifications of the second type of image elements based on the property.

In one aspect of the invention, the method comprises steps of determining whether selected image elements positioned along a horizontal row are of the second type, calculating a first characteristic function value of the property values of the selected image elements if the selected image elements are of the second type, determining whether the first characteristic function value meets a predetermined threshold to obtain a first classification result, calculating a second characteristic function value for each of the selected elements—the second characteristic function value being based on a stored value calculated from the property values of the each selected element and adjacent image elements of the second type disposed along a vertical column in which the each selected element is positioned, determining whether each of the second characteristic function values meets the predetermined threshold to obtain respective second classification results and classifying each of the selected elements based on the first and second classification results.

In a more limited aspect of the invention, determining whether selected image elements positioned along a horizontal row are of the second type includes scanning the digital image on an image element by image element basis and detecting whether image elements being scanned are white.

In a more limited aspect of the invention, the method further comprises summing the values of a property of adjacent successive image elements of the second type disposed along the horizontal row.

In a more limited aspect of the invention, the method further comprises determining a number of the adjacent successive image elements of the second type.

In a more limited aspect of the invention, calculating of the first characteristic function value includes calculating an average based on the values summed and the number of determined adjacent successive image elements of the second type.

In a more limited aspect of the invention, the method further comprises determining a number of the image elements upon which the stored value is based.

In a more limited aspect of the invention, the value of a property of an image element is added to a stored value for the column of that image element to update that stored value.

In a more limited aspect of the invention, the second characteristic function value is further based on the number determined.

In a more limited aspect of the invention, the property is one of color, half-tone and text.

In a more limited aspect of the invention, classifying each of the selected elements includes resolving inconsistencies in the first and second classification results in a predetermined manner.

In another aspect of the invention, an apparatus is provided to implement the method according to the present invention.

In another aspect of the invention, the method comprises steps of obtaining the digital image, scanning the digital image on an image element by image element basis—the scanning being conducted in a background mode if an adjacent image element previously scanned is a background element and in a non-background mode if the adjacent image element previously scanned is a non-background element, determining whether the scanning is in the background mode, successively selecting background elements and initializing a column strength value for each background element if the scanning is in the background mode, converting the scanning to the non-background mode if a non-background element is detected during the scanning in the background mode, summing values corresponding to the property for successive adjacent non-background elements and adding values corresponding to the property to the column strength value for each non-background element while in the non-background mode, detecting a background element thereby indicating an end of a run of successive adjacent non-background elements, calculating a first average for the successive adjacent non-background elements disposed along a selected row based on the summed values and a length of the run, determining whether the first average strength meets a predetermined threshold to obtain a first classification result, calculating a second average for each of the selected elements—the second average being based on the column strength value of the each selected element, determining whether each of the second averages meets the predetermined threshold to obtain respective second classification results and classifying each of the successive adjacent elements with respect to a property based on the first and second classification results.

In a more limited aspect of the invention, classifying each of the selected elements includes resolving inconsistencies in the first and second classification results in a predetermined manner.

A primary advantage of the invention, when compared to the heretofore known techniques, is that the present invention provides more information, i.e. information based on a two-dimensional analysis, upon which to base segmentation decisions and does so with reduced storage requirements.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
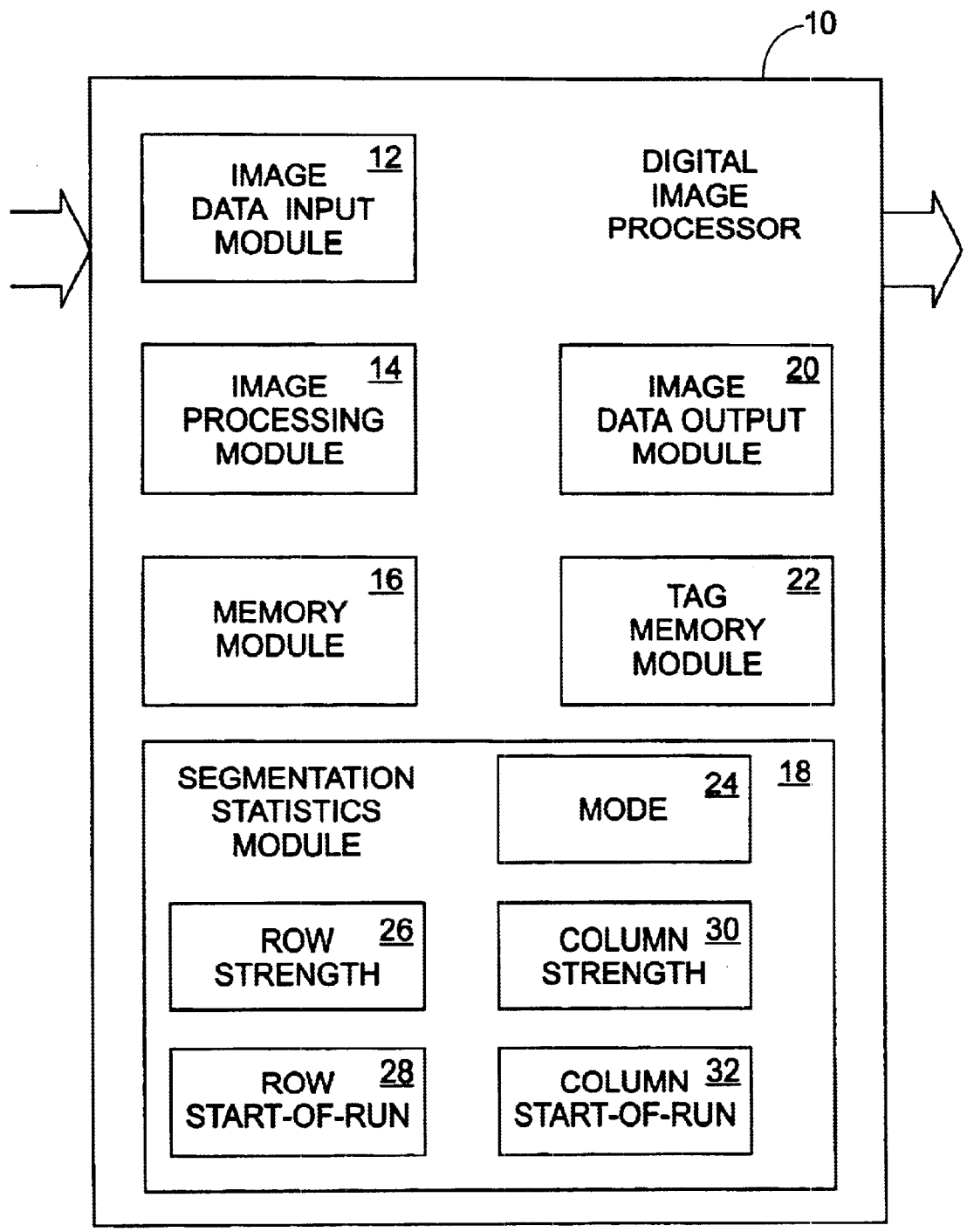
FIG. 1 is a schematic representation of a system performing the preferred method according to the present invention.

Referring now to the drawings wherein the showings are for purposes of illustrating the preferred embodiments of the invention only and not for purposes of limiting same, FIG. 1 provides a view of the overall preferred system according to the present invention. As shown, a digital image processing system 10 useful for segmenting a digital image includes an image data input module 12, an image processing module 14, a memory module 16, a segmentation statistics module 18, an image data output module 20, and a tag memory module 22.

More specifically, the image data input module 12 obtains image data to be processed by the system 10. It is to be appreciated that the image data input module 12 obtains image data from a scanner or device for reading a stored image from a memory, such device being incorporated into, for example, a digital copier, a stand alone scanner, or a fax machine. The image data represents an image comprised of a plurality of image elements which are disposed in an arrangement of horizontal rows and vertical columns. The image elements are either a first type positioned in the background or a second type positioned in a non-background portion. The image elements of the second type also potentially possess a property for which a value is assigned. They may be classified or tagged as one of at least two classes based on the values of the property.

The image data output module 20 may output the image data according to the contemplated segmentation subsequent to application of the method of the present invention. The image data output module may also output the determined tag values stored in tag memory module 22. It is to be further appreciated that the image data output module may also include a software program for generating an image or a word processing program that generates a page of text or a page of mixed text and images.

Figure 2:
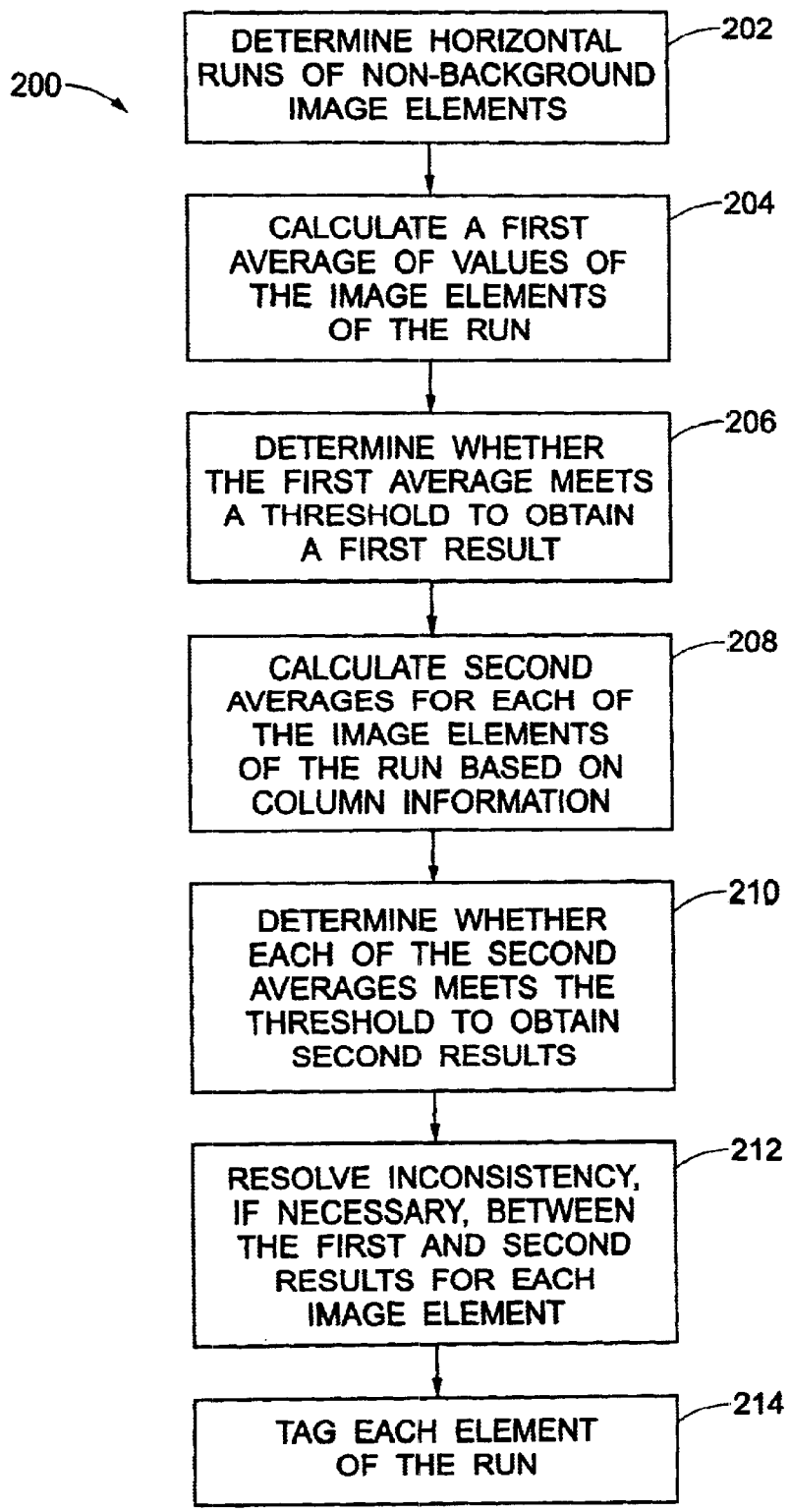
FIG. 2 is a flowchart illustrating the preferred method according to the present invention; and, FIG. 3 is a more detailed flowchart illustrating the preferred method according to the present invention.
Figure 3:
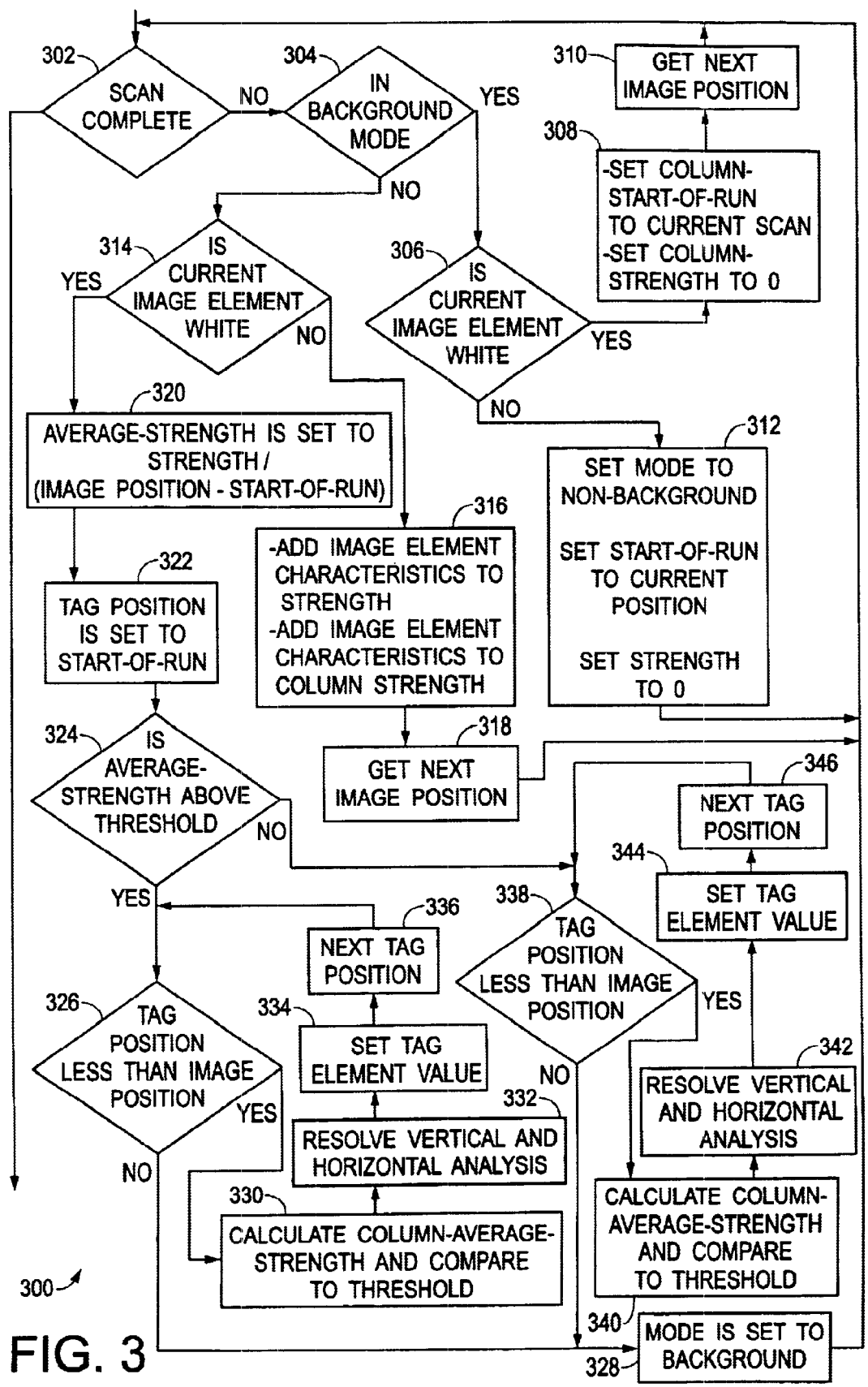

The image processing module 14 may take a variety of forms that are well known in the art. For purposes of the present invention, the imaging processing module processes the image data received by the image data input module 12, at least in part, by applying the method of the present application to the image data. It is to be appreciated that this method may be implemented using a variety of hardware and software techniques that will be apparent to those skilled in the art upon a reading of this disclosure. In a preferred form, however, the instruction code necessary for implementing the method that will be hereafter described in connection with FIGS. 2 and 3 is stored in the memory module 16.

The segmentation statistics module 18 includes a variety of elements that are advantageously used in connection with implementation of the method of the present invention. In this regard, the segmentation statistics module includes a mode register 24 that has stored therein information on the current mode of operation of the scanning process according to the present invention. Specifically, the mode register 24 retains information on whether the scan or segmentation process is operating in a background mode or a non-background mode.

In addition, the segmentation statistics module 18 maintains information related to the horizontal (or row) runs and vertical (or column) runs of non-background image elements that comprise the image data. Specifically, the module 18 includes a row strength module 26, a row start-of-run module 28, a column strength module 30 and a column start-of-run module 32.

The row strength module 26 has stored therein a value representing a sum of strength values—related to a property of interest—of a horizontal run of image elements. It should be appreciated that, although the value stored in the preferred embodiment is a sum, any value representing contributing values to be used for purposes of the invention would suffice. The position representing the start of that run is stored in the row start-of-run module 28.

Likewise, the column strength module 30 has stored therein values representing a sum of property strength values of non-background elements in a vertical run for each image element being analyzed in the horizontal run of interest. As with the module 26, it should be appreciated that, although the value stored in the preferred embodiment is a sum, any value representing contributing values to be used for purposes of the invention would suffice. Data is also maintained on the start of each vertical run in column start-of-run module 32.

It will be appreciated that data is stored for each column in modules 30 and 32. However, because the stored values represent sums and starting points, it is not necessary to retain the values of each of the image elements in the vertical runs. This, of course, results in significant advantages in that information relating to vertical runs is retained; however, excessive storage space is not utilized in order to do so.

The tag memory module 22 is also utilized during the implementation of the method of the present invention once the final determination is made as to whether specific image elements have the property sought to be identified or not. The tag memory module retains information on the tag for each image element of interest as well as information on the location at which the tagging process is taking place.

Referring now to FIG. 2, a general description of the overall preferred method is provided. It is to be appreciated that the overall objective of the method is to segment an image based on whether portions of the image possess a particular property. The properties used as examples herein are color, half-tone, and text. However, any suitable property of an image is contemplated to be used as a basis for segmentation by the invention. Moreover, as noted above, the image elements analyzed have assigned thereto a strength or property value associated with the property that provides the basis for segmentation.

More particularly, the method 200 is implemented by scanning the image data on an image element by image element basis. Initially, horizontal runs of non-background image elements are determined by determining whether selected image elements positioned along a horizontal row are of the second type (step 202). A first average of the property values of the image elements of the run are then calculated (step 204). It should be appreciated that, although first averages and second averages are calculated in the preferred embodiment of FIGS. 1–3, any characteristic function value of the selected set of property values indicating their collective behavior could be used. A determination is then made whether the first average (or some other characteristic function value of the selected set of property values indicating their collective behavior) meets a threshold to obtain a first classification result as to whether the image elements of interest possess the particular property being determined (step 206).

Next, second averages for each of the image elements of the run (or some other characteristic function value of the selected set of property values indicating their collective behavior) are calculated based on stored column information, e.g. a stored value representing a sum of the property values of the each image element and adjacent image elements of the second type disposed along a vertical column in which the image element of interest is positioned (step 208). A determination is made whether each of the second averages meets the threshold to obtain second classification results as to whether the image elements of interest possess the property (step 210). If there is any inconsistency between the first and second classification results for any of the image elements, the inconsistency is resolved in a predetermined manner, as will be discussed below (step 212). Last, each image element of the run is classified or tagged—as having the property of interest or not having the property of interest—according to the first and second classification results and the predetermined criteria, as necessary (step 214).

A more detailed implementation of the method of FIG. 2 is described in connection with FIG. 3. Initially, of course, a digital image (or part thereof) is accessed and scanning is initiated. As should be apparent to those skilled in the art, the image data could take a variety of forms, including streaming data, and could be handled in a variety of manners. The scanning is conducted in a background mode if an adjacent image element previously scanned is a background element and in a non-background mode if the adjacent image element previously scanned is a non-background element.

As shown, a method 300 begins with a determination of whether the scanning is complete (step 302). If the process is not complete, then a determination is made as to whether the scanning is being conducted in a background mode based on the content of register 24 (step 304). If so, a determination is made whether the current image element is white (or background) (step 306). If so, the current image position is stored in the column start-of-run module 32 and the column strength module 30 is initialized to zero (step 308). The process then proceeds to the next image element position (step 310) and the steps beginning at step 302 are repeated.

If, at step 306, the current image element is not white (or non-background), the mode module 24 is set to non-background, the row start-of-run module 28 is set to the current position, and the row strength module 26 is initialized to zero (step 312). The process then proceeds back to step 302.

If, at step 304, it is determined that the mode module 24 is not set to background mode, then a determination is made whether the current image element is white (step 314). If not, the value of the image element relating to the property being analyzed is summed or added to the row strength module 26 and the column strength module 30 (step 316). The process then proceeds to the next image element position (step 318) and steps beginning at step 302 are repeated.

If the determination in step 314 indicates that the current image element is white, then the average strength of the image elements of the horizontal run (e.g. adjacent image elements of the second type) is calculated (step 320). This average strength, or first average, is based on the value stored in the row strength module 26 and the length of the run which is determined. It is to be appreciated that the length of the run is simply based on the current image position and the data stored in the row start-of-run module 28 and represents a number of adjacent successive image elements of the second type.

A tag position is then set in the tag memory module 22 to be the same as the row start of run position stored in the row start-of-run module 28 (step 322). A determination is then made as to whether the average strength calculated is above a predetermined threshold (step 324).

If so, a determination is made as to whether the current tag position is less than the image position at the end of the run (step 326). If not, the mode is set to the background mode in mode module 24 (step 328) and the process returns to step 302. If, however, the tag position is less than the image position, a second average, or column strength average, is calculated and compared to the threshold (step 330). The second average is based on the value stored in module 30 and the length of the vertical run. The length of the run is based on the current image position and the value stored in the module 32 and represents a number of image elements upon which the stored value in module 30 is based. If the comparison to the threshold has a different result than the comparison to the threshold of step 324, then the inconsistency is resolved as will be described below (step 332). The image element is then classified or tagged with an appropriate tag value (step 334). The method then proceeds to the next tag position (step 336) and to step 326.

If the row strength average is not above a predetermined threshold as determined at step 324, a determination is then made whether the tag position is less than the image position (step 338). If not, the process proceeds to step 328, and then to step 302. If so, the column average strength is calculated and compared to the predetermined threshold (step 340). If the result of this comparison to the threshold differs than the result of the comparison to the threshold in step 324, a resolution between this inconsistency occurs as will be described below (step 342). The image element is then classified or tagged with an appropriate tag value (step 344). The process then proceeds to the next tag position (step 346) and to step 338.

As is apparent from the figures and description above, maintenance of information from one scan line to the next scan line is an advantageous feature of the present invention. Scanning occurs in the horizontal direction but information relating to analysis in the vertical direction is maintained. Of course, the method could be adapted to accommodate scanning in the vertical direction.

The method also advantageously provides for the determination of a strength value and the start-of-run for each horizontal run of non-white or non-background data, as well as a column-strength value and column-start-of-run for each column of image elements. It is thus not necessary to maintain the full column of image data, just the current scan line of data and the statistics on the vertical analysis gathered for the image up to that point in the process. Of course, this requires less storage and, consequently, more flexibility of use of the method.

Significantly, the image element characteristics are added to column-strength values during processing. As such, once the end of a horizontal run of non-background image elements is detected, the method successively analyzes image elements to set their tag element values according to data accumulated on the image elements during the processing of the horizontal run of interest. In addition, the current column-strength values for each of the image elements are considered to determine that which the vertical analysis would indicate as the proper tag setting. It is to be appreciated that the horizontal analysis utilizes data obtained on the entire run of non-background image elements, but the vertical analysis is only accomplished based on the amount of the vertical run that has been exposed thus far.

If the conclusions of the horizontal and vertical processing are consistent, then the desired setting for the tag element value is dictated entirely by the agreed conclusion or result. However, if the horizontal and vertical analyses lead to different conclusions, then a predetermined strategy for resolving the difference is employed.

Various such strategies are contemplated. One strategy is to choose the safer of the choices. For example, if the analysis is to determine if the image is neutral in color (only grays) so that it can be processed using only black-and-white processing and printing, then the safer strategy is to tag the image element as colored when in doubt. The color processing can reproduce the black-and-white image, and while this processing may be less efficient, there is no loss of image information. The black-and-white processing, however, cannot reproduce color if it is present, and choosing it involves the risk of producing a defective result.

Another strategy is to decide that the analysis result with the average strength that gives the greatest difference from the threshold should be followed. The idea is to consider whichever analysis is giving the strongest signal to be indicating the most certain conclusion.

Still another strategy is to choose the result according to the run lengths involved. One may choose to disregard a result if the run length is too short because there are insufficient statistics for a confident decision. Or one may choose the result corresponding to the analysis with the shortest run length because this is the most local to the image element in question and may be the most characteristic of it.

There are many other possible strategies that will be apparent to those skilled in the art upon a reading of this disclosure. It is to be appreciated that the selection depends largely on the property being determined, and on the characteristics or properties of the images being analyzed.

The above description merely provides a disclosure of particular embodiments of the invention and is not intended for the purposes of limiting the same thereto. As such, the invention is not limited to only the above described embodiments. Rather, it is recognized that one skilled in the art could conceive alternative embodiments that fall within the scope of the invention.

Having thus described the invention, I hereby claim:

1. A method for segmenting a digital image, the digital image being comprised of a plurality of image elements disposed in an arrangement of horizontal rows and vertical columns, the image elements including a first type positioned in a background portion and a second type positioned in a non-background portion, the second type of the image elements each having a value defining a strength of a property, there being at least two classifications of the second type of image elements based on the property, the method comprising steps of:

- determining whether selected image elements positioned along a horizontal row are of the second type;
- calculating a first characteristic function value of the property values of the selected image elements if the selected image elements are of the second type;
- determining whether the first characteristic function value meets a predetermined threshold to obtain a first classification result;
- calculating a second characteristic function value for each of the selected elements, the second characteristic function value being based on a stored value calculated from the property values of the each selected element and adjacent image elements of the second type disposed along a vertical column in which the each selected element is positioned;
- determining whether each of the second characteristic function values meets the predetermined threshold to obtain respective second classification results; and,
- classifying each of the selected elements based on the first and second classification results.

2. The method as set forth in claim 1 wherein the determining whether selected image elements positioned along a horizontal row are of the second type includes scanning the digital image on an image element by image element basis and detecting whether image elements being scanned are white.

3. The method as set forth in claim 1 further comprising summing the values of a property of adjacent successive image elements of the second type disposed along the horizontal row.

4. The method as set forth in claim 3 further comprising determining a number of the adjacent successive image elements of the second type.

5. The method as set forth in claim 4 wherein the calculating of the first characteristic function value includes calculating an average based on the values summed and the number of determined adjacent successive image elements of the second type.

6. The method as set forth in claim I further comprises determining a number of the image elements upon which the stored value is based.

7. The method as set forth in claim 1 wherein the value of a property of an image element is added to the stored value for the column of that image element to update that stored value.

8. The method as set forth in claim 6 wherein the second characteristic function value is an average that is further based on the number determined.

9. The method as set forth in claim 1 wherein the property is one of color, half-tone and text.

10. The method as set forth in claim 1 wherein classifying each of the selected elements includes resolving inconsistencies in the first and second classification results in a predetermined manner.

11. A digital image processor useful for segmenting a digital image, the digital image being comprised of a plurality of image elements disposed in an arrangement of horizontal rows and vertical columns, the image elements including a first type positioned in a background portion and a second type positioned in a non-background portion, the second type of the image elements each having a value defining by a strength of a property, there being at least two classifications of the second type of image elements based on the property, the system comprising:

- means for determining whether selected image elements positioned along a horizontal row are of the second type;
- means for calculating a first average of the values of the selected image elements if the selected image elements are of the second type;
- means for determining whether the first average meets a predetermined threshold to obtain a first classification result;
- means for calculating a second average for each of the selected elements, the second average being based on a stored value representing a sum of the values of the each selected element and adjacent image elements of the second type disposed along a vertical column in which the each selected element is positioned;
- means for determining whether each of the second averages meets the predetermined threshold to obtain respective second classification results; and,
- means for classifying each of the selected elements based on the first and second classification results.

12. The digital image processor as set forth in claim 11 wherein the means for determining whether selected image elements positioned along a horizontal row are of the second type further includes means for scanning the digital image on an image element by image element basis and means for detecting whether image elements being scanned are white.

13. The digital image processor as set forth in claim 11 further comprising means for summing the values of adjacent successive image elements of the second type disposed along the horizontal row.

14. The digital image processor as set forth in claim 13 further comprising means for determining a number of the adjacent successive image elements of the second type.

15. The digital image processor as set forth in claim 14 wherein the means for calculating the first average uses the values summed and the number of determined adjacent successive image elements of the second type.

16. The digital image processor as set forth in claim 11 further comprising means for determining a number of the image elements upon which the stored value is based.

17. The digital image processor as set forth in claim 16 wherein the second average is further based on the number determined.

18. The digital image processor as set forth in claim 11 wherein the property is one of color, half-tone and text.

19. The digital image processor as set forth in claim 11 wherein the means for classifying each of the selected includes means for resolving inconsistencies in the first and second classification results in a predetermined manner.

20. A method for segmenting a digital image, the digital image being comprised of a plurality of image elements disposed in an arrangement of horizontal rows and vertical columns, the image elements including background image elements and non-background image elements, the non-background image elements each having a value defining a strength of a property, there being at least two classifications of the non-background image elements based on the property, the method comprising steps of:

- accessing the digital image;
- scanning the digital image on an image element by image element basis, the scanning being conducted in a background mode if an adjacent image element previously scanned is a background element and in a non-background mode if the adjacent image element previously scanned is a non-background element;

determining whether the scanning is in the background mode;

successively selecting background elements and initializing a column strength value for each background element if the scanning is in the background mode;

converting the scanning to the non-background mode if a non-background element is detected during the scanning in the background mode;

summing values corresponding to the property for successive adjacent non-background elements and adding values corresponding to the property to the column strength value for each non-background element while in the non-background mode;

detecting a background element thereby indicating an end of a run of successive adjacent non-background elements;

calculating a first average for the successive adjacent non-background elements disposed along a selected row based on the summed values and a length of the run;

determining whether the first average strength meets a predetermined threshold to obtain a first classification result;

calculating a second average for each of the selected elements, the second average being based on the column strength value of the each selected element;

determining whether each of the second averages meets the predetermined threshold to obtain respective second classification results; and, classifying each of the successive adjacent elements based on the first and second classification results.

21. The method as set forth in claim 20 wherein classifying each of the selected elements includes resolving inconsistencies in the first and second classification results in a predetermined manner.

* * * * *